Oct. 7, 1952        G. F. McKAY        2,612,741
LAWN TRIMMER
Filed Nov. 9, 1950        2 SHEETS—SHEET 1
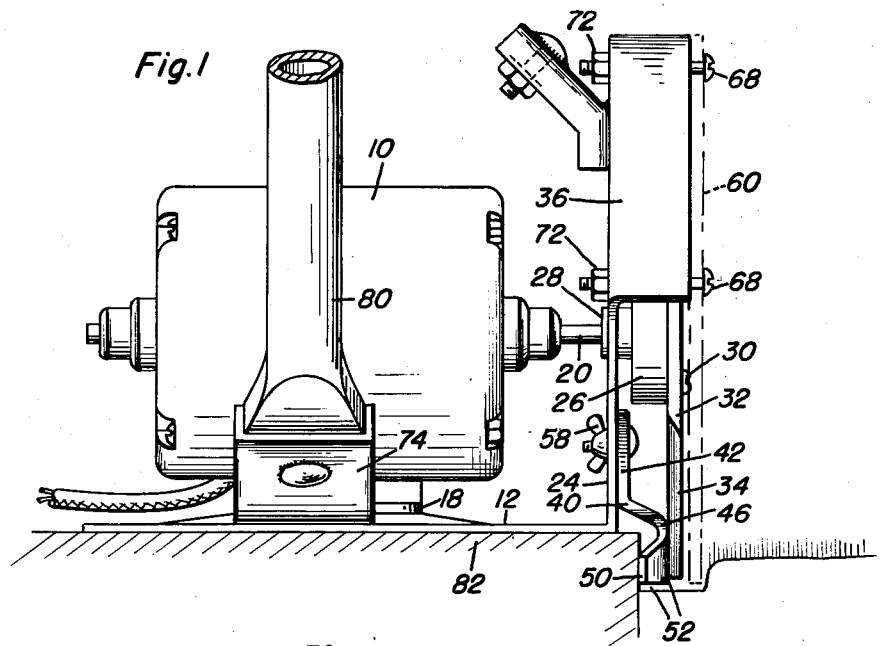
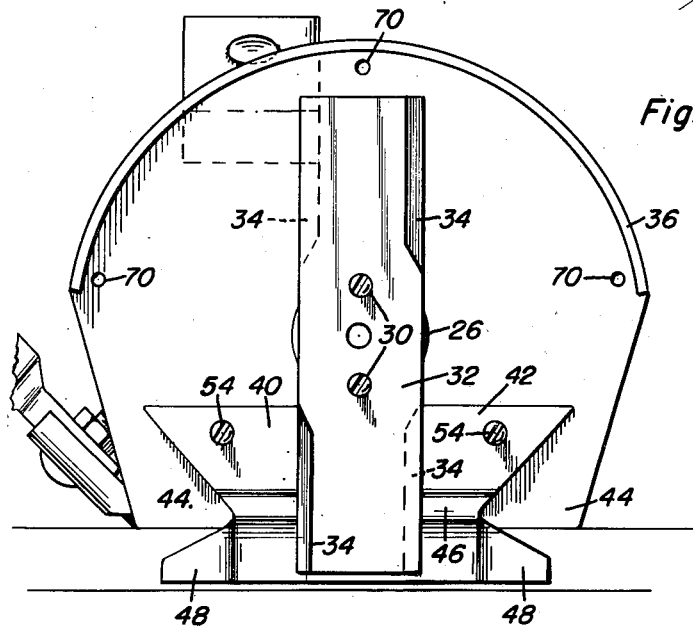
Inventor
George F. McKay
By Clarence A. O'Brien
and Harvey B. Jacobson
Attorneys Oct. 7, 1952  G. F. McKAY  2,612,741
LAWN TRIMMER
Filed Nov. 9, 1950  2 SHEETS—SHEET 2
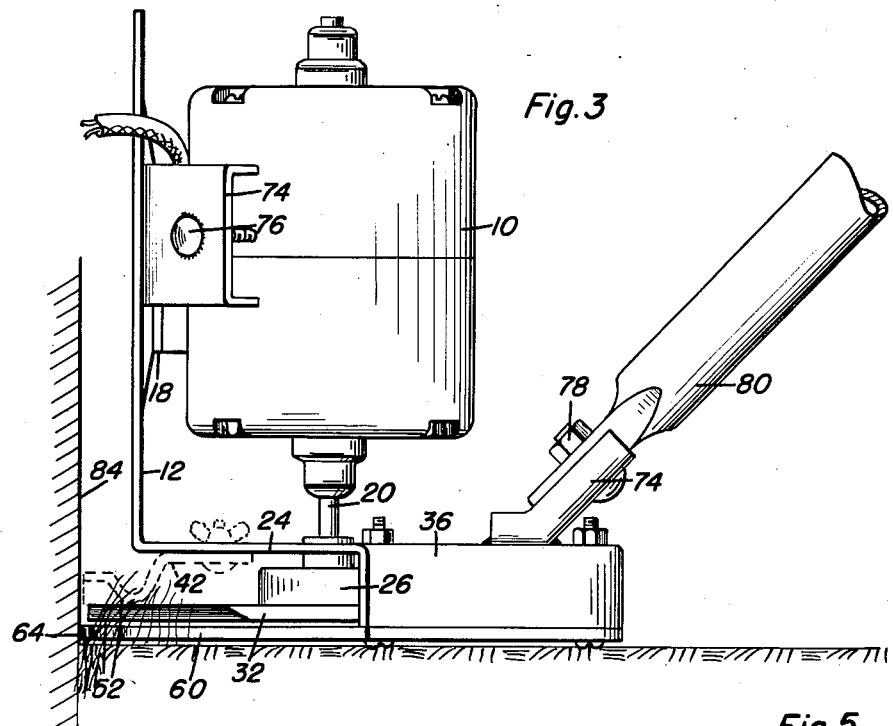
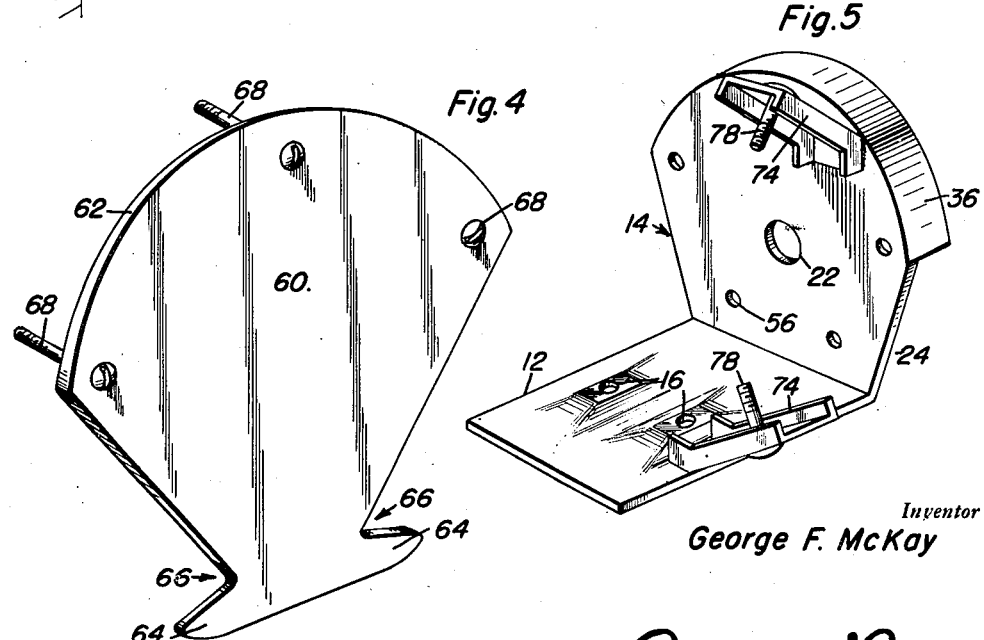
Inventor
George F. McKay
By Clarence A. O'Brien
and Harvey B. Jacobson
Attorneys Patented Oct. 7, 1952

2,612,741

UNITED STATES PATENT OFFICE 2,612,741

LAWN TRIMMER

George F. McKay, Brownwood, Tex.

Application November 9, 1950, Serial No. 194,919

4 Claims. (Cl. 56—25.4)

This invention relates to grass cutting equipment and more particularly to a machine for trimming grass along the edges of sidewalks, curbs, walls, fences and the like.

It is an object of this invention to provide a machine of the character described which is of sturdy construction and adapted for use by an operator while standing or walking along.

Another object is to provide an improved lawn trimmer which comprises a rotating blade and associated mechanism for gathering and guiding grass to be cut into position to be severed by the rotating blade.

Another object is to provide an electrically operated trimmer which may be operated while held in either a horizontal or vertical position.

Still another object envisions a law trimmer of simple and sturdy construction and having but few working parts, and such as is economical to manufacture.

These and other objects and advantages which will become apparent as the description proceeds is attained by the present invention, the accompanying drawings illustrating a prepared embodiment of the same, and in which:

Figure 1 is a rear elevational view of a lawn trimmer constructed in accordance with this invention and illustrating the machine in position for operating the rotary cutting blade in a vertical plane, and such as utilized for trimming grass along the edge of a sidewalk, the outer grass-gatherer face plate being shown in dotted lines;

Figure 2 is a side elevational view of the trimmer shown in Figure 1 with the outer grass-gatherer face plate removed to illustrate the construction and arrangement of the rotary blade and inner grass-gatherer member;

Figure 3 is a side elevational view of the machine and illustrating the trimmer in position for operating the rotary cutting blade in a horizontal position, the outer grass-gatherer face plate being shown in place with the inner grass-gatherer plate illustrated in dotted lines;

Figure 4 is a perspective view of the outer grass-gatherer face plate; and

Figure 5 is a view in perspective of the L-shaped base plate and showing the handle receiving bracket mountings thereon, the motor, blade and associated parts being omitted.

Referring to the drawings in detail wherein like reference characters indicate similar parts throughout the various views, the lawn trimmer illustrated comprises a motor 10 of conventional type construction, and preferably operable when connected to the ordinary household alternating current circuit, the motor being suitably secured to a rectangular shaped plate 12 which forms an integral leg portion of an L-shaped frame structure generally designated 14 and illustrated in Figure 5. The plate 12 is provided with spaced apertures 16 therein for receiving bolts or screws for suitably fastening the base portion 18 of the motor to the plate 12.

The motor armature shaft 20 extends through an aperture 22 in the plate 24 which forms the other integral leg portion of the L-shaped frame member 14. On the outer end of the shaft 20 there is mounted a cylindrically shaped tool holder 26 having a reduced integral boss 28 which fits loosely in the aperture 22 of the plate 24, the tool holder being keyed or otherwise firmly secured onto the shaft 20 so as to rotate therewith. Suitably attached to the face of the tool holder 26, as by means of screws 30, is a rotary cutting blade 32 having the beveled and sharpened cutting edge portions 34. The tool holder and rotary blade mechanism is partially enclosed by an arcuate-shaped outwardly extending housing 36 which forms an integral part of the plate 24.

An important feature of the invention comprises the grass-gathering plate means which cooperate with the cutting rotary blade, as the machine is moved along walls, fences and walks, to gather and guide the grass into the rotary blade. One such grass-gatherer member 40 is illustrated in Figures 1 and 2 and comprises an elongated S-shaped member having a flange portion 42 with diametrically opposed cutaway sections 44 and an outwardly extended curved section 46, which is adapted to closely approach the rotary blade, as shown in Figure 1. The lower part of the member 40 comprises integral fingers or sections 48 which are curved away from the blade so that the end portions 50 at opposite sides of the member 40 gather and guide grass into position to be cut by the rotating blade, and as illustrated in Figure 1.

This grass-gatherer member is suitably attached to the plate 24 by means of bolts 54 which engage in the apertures 56 and are secured in place by the winged nuts 58. The grass-gatherer plate 40 is arranged to extend slightly beyond the end of the rotary blade to prevent the same from coming into contact with a wall or other object during use of the trimmer.

A second grass-gatherer plate, generally designated 60, is provided which comprises a V-shaped body portion having an arcuate top section which is shaped to conform with the periphery of the housing 36. At the lower end, as illustrated in Figure 4, the plate 60 comprises laterally extending diametrically positioned fingers 64 for gathering grass and guiding the same into the cutaway sections 66 and in position to be cut by the rotating blade. The plate 60 is suitably secured against the outer periphery of the housing 36 as by means of bolts 68 which are inserted in the apertures 70 in the plate 24 and are fastened in place by nuts 72.

To provide suitable means for operating the trimmer in either a vertical or horizontal position relative to the rotary blade, and as illustrated in Figures 1 and 3, a U-shaped handle receiving bracket 74 is mounted on each of the frame plates 12 and 14. The bracket is apertured, as at 76 for receiving a bolt 78 to fasten a handle 80 in place as will be understood for operation of the trimmer.

When it is desired to operate the machine and trim grass adjacent a sidewalk, such as illustrated in Figure 1 at 82, the operating handle 80 is fixedly positioned in the bracket 74 mounted on the plate 12, and the motor operated while the trimmer is supported on the sidewalk and moved therealong. The fingers 48 on the grass-gatherer plate 40 as illustrated in Figure 1, function both to protect the rotary blade 32 against striking the sidewalk as well as gather and guide grass growing closely adjacent to the walk into the path of the rotating blade. In the operation of the lawn trimmer, as illustrated in Figure 1, the outer plate 60 should be omitted.

Where it is desired to operate the trimmer with the rotary blade in a horizontal plane, such as when trimming grass adjacent to a wall, for example as indicated at 84 in Figure 3, the handle 80 will be fixed to the bracket on the plate 24. In this example the grass-gatherer and guard plate 60 is preferably employed with omission of the grass-gatherer plate 40, as desired. In this instance the fingers 64 on the plate 60 gathers the grass into the cutaway portion 66, as the trimmer is moved back and forth adjacent a wall or object, whereby the grass is brought into position to be cut by the rotating blade.

From the foregoing description and accompanying drawings the operating of the lawn trimmer machine of this invention will be readily understood and further explanation is deemed unnecessary.

While in the foregoing there has been shown and described the preferred embodiment of the invention, it is to be understood that changes may be made in the details of construction and arrangement of the parts without departing from the spirit and scope of the invention as claimed in the appended claims.

Having described the invention, what is claimed as new is:

1. In a lawn trimmer the combination of a frame having a rectangular base and integral upstanding flange member extending at right angles thereto, a motor mounted on said rectangular base member, said flange member having an aperture therein, a shaft driven by said motor and extending through said aperture in said upstanding flange member, a rotary blade mounted on said shaft and parallel to said flange, and means for positioning said motor and blade for operation in either a horizontal or vertical plane, a grass-gatherer plate mounted adjacent said blade, said grass-gatherer plate extending beyond the end of said blade.

2. The combination of claim 1 wherein the grass-gatherer means comprises an elongated S-shaped member having a flange portion with diametrically opposed cutaway sections and an outwardly extended curved section which is adapted to be arranged so as to cooperate with said grass cutting means by gathering grass and guiding the same into position to be cut by said cutting means.

3. The combination of claim 1 wherein the grass-gathering means comprises a V-shaped body having laterally extending diametrically positioned finger members.

4. In a lawn trimmer, the combination of an L-shaped frame, said frame including a rectangular base and a flange member extending at right angles thereto, a motor mounted on said base plate, said flange member having an aperture therein, a shaft driven by said motor and extending through said aperture, a rotary blade mounted on said shaft and parallel to said flange, means for positioning said motor and blade for operation in either a horizontal or vertical plane, a grass-gatherer plate mounted adjacent said blade, said grass-gatherer plate extending beyond the end of said blade, said plate including an elongated S-shaped member, said S-shaped flange having opposed cut-away sections and an outwardly extended curved section, fingers curved away from the blade.

GEORGE F. McKAY.

REFERENCES CITED

The following references are of record in the file of this patent:

UNITED STATES PATENTS

| Number | Name | Date |
| --- | --- | --- |
| Re. 21,274 | Orr | Nov. 21, 1939 |
| 1,189,519 | Word | July 4, 1916 |
| 1,274,784 | Richardson | Aug. 6, 1918 |
| 2,139,353 | Bruder | Dec. 6, 1938 |
| 2,212,057 | Waller | Aug. 20, 1940 |
| 2,410,196 | Benthall | Oct. 29, 1946 |
| 2,491,993 | McClay | Dec. 20, 1949 |
| 2,547,328 | Koch | Apr. 3, 1951 |